(12) United States Patent
Newhouse et al.

(10) Patent No.: US 8,049,372 B2
(45) Date of Patent: Nov. 1, 2011

(54) PRECHARGING A HIGH-VOLTAGE BUS USING A VOLTAGE-REGULATED POWER SUPPLY

(75) Inventors: Vernon L. Newhouse, Farmington, MI (US); Jason A. Nassar, Hazel Park, MI (US); Jeffrey T. Wolak, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 12/165,899

(22) Filed: Jul. 1, 2008

(65) Prior Publication Data

US 2010/0001582 A1    Jan. 7, 2010

(51) Int. Cl.
*H01H 31/10* (2006.01)
(52) U.S. Cl. .......................................... 307/115
(58) Field of Classification Search ................. 307/10.1, 307/112, 115
See application file for complete search history.

(56) References Cited

U.S. PATENT DOCUMENTS

| | | | |
|---|---|---|---|
| 5,717,310 A * | 2/1998 | Sakai et al. | 307/10.1 |
| 6,597,072 B2 * | 7/2003 | Yamazaki | 307/9.1 |
| 6,624,531 B2 * | 9/2003 | Disser et al. | 307/10.1 |
| 6,882,129 B2 * | 4/2005 | Boskovitch et al. | 320/119 |
| 7,342,759 B2 * | 3/2008 | Albayrak et al. | 361/63 |
| 7,586,214 B2 * | 9/2009 | Clarke et al. | 307/130 |
| 2008/0185999 A1 * | 8/2008 | Matsukawa et al. | 320/166 |

FOREIGN PATENT DOCUMENTS

| | | | |
|---|---|---|---|
| WO | WO2008105612 | * | 9/2007 |
| WO | WO2008041418 | * | 4/2008 |

\* cited by examiner

*Primary Examiner* — Michael Rutland Wallis
(74) *Attorney, Agent, or Firm* — Ingrassia Fisher & Lorenz P.C.

(57) ABSTRACT

Systems and methods are provided for precharging high-voltage buses. The precharge system comprises an energy source having a first terminal and a second terminal, wherein a first voltage is equal to a potential difference between the first terminal and the second terminal. The precharge system further comprises a bus having a first rail and a second rail, wherein a second voltage is equal to a potential difference between the first rail and the second rail. A first contactor is coupled between the first terminal and the first rail and a second contactor is coupled between the second terminal and the second rail. A controller is coupled to the energy source, the bus, and the contactors. The controller is configured to activate the second contactor, and thereafter activate the first contactor if the magnitude of a difference between the first voltage and the second voltage is less than a threshold tolerance.

20 Claims, 4 Drawing Sheets

US 8,049,372 B2

PRECHARGING A HIGH-VOLTAGE BUS USING A VOLTAGE-REGULATED POWER SUPPLY

TECHNICAL FIELD

Embodiments of the subject matter described herein relate generally to electric and hybrid vehicles, and more particularly, embodiments of the subject matter relate to systems and circuits for precharging a high-voltage bus.

BACKGROUND

In recent years, advances in technology, as well as ever evolving tastes in style, have led to substantial changes in the design of automobiles, particularly the development of electric and hybrid drive systems for improved fuel efficiency. In most hybrid or electric vehicles, high-voltage energy storage systems are utilized to improve efficiency. These high-voltage energy storage systems may capture energy within the powertrain system, for example, by using regenerative braking to convert kinetic energy to electrical energy and storing the electrical energy. Additionally, the high-voltage energy storage systems may store electrical energy supplied from a power supply or charger.

Because of the power capacity of the high-voltage energy storage systems and the desire to retain energy for long periods of time, it is therefore desirable that these high-voltage energy storage systems remain primarily disconnected from other devices and connected as needed. Often, contactors or similar connection mechanisms are used to connect vehicle devices to the high-voltage energy storage systems. However, if the high-voltage energy storage system is connected directly to a device which has an electrical potential that differs from the electrical potential of the energy storage system, a large inrush current will occur. This inrush current may potentially damage electrical components or weld the contactors shut, such that the contactors remain in a permanently closed state.

Accordingly, systems have developed that utilize inrush current limiting to connect the high-voltage energy storage systems with vehicle devices. Most of these systems utilize a precharge resistor connected in series with an additional precharge contactor that is connected to the device. The precharge contactor is closed, allowing a limited current to flow to the device based on the precharge resistor and the RC characteristics of the combined system. Once the voltage supplied to the device reaches a stable level, another contactor is closed and the precharge contactor is opened, thereby removing the precharge resistor from the circuit. These systems often incorporate additional hardware or software to monitor the voltage supplied to the device. Furthermore, there is a delay inherent to these precharge systems, because the RC time constant of these precharge systems governs the time required before connecting the device and transferring high-voltage energy to/from the energy storage system.

BRIEF SUMMARY

An apparatus is provided for a precharge system for use in a vehicle. The precharge system comprises a first energy source having a first terminal and a second terminal, wherein the first energy source has a first voltage equal to a potential difference between the first terminal and the second terminal. The precharge system further comprises a bus having a first rail and a second rail, wherein the bus has a second voltage equal to a potential difference between the first rail and the second rail. A first contactor is coupled between the first terminal and the first rail and a second contactor is coupled between the second terminal and the second rail. A controller is coupled to the first energy source, the bus, the first contactor, and the second contactor. The controller is configured to activate the second contactor, and thereafter activate the first contactor if the magnitude of a difference between the first voltage and the second voltage is less than a threshold tolerance.

A method is provided for precharging a bus coupled to a power supply which is configured to regulate the voltage of the bus. The bus is coupled to a set of contactors, wherein the set of contactors is coupled to an energy source. The method comprises commanding the power supply to a voltage level equal to the voltage of the energy source, and thereafter activating the set of contactors if the magnitude of a difference between the voltage of the bus and the voltage of the energy source is less than a threshold tolerance.

An apparatus is provided for a vehicle. The vehicle comprises a high-voltage battery pack having a first voltage and a set of contactors coupled to the high-voltage battery pack. A bus is coupled to the set of contactors, wherein the bus has a second voltage. A controller is coupled to the high-voltage battery pack, the set of contactors, and the bus. The controller is configured to activate the set of contactors if the magnitude of a difference between the first voltage and the second voltage is less than a threshold tolerance.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
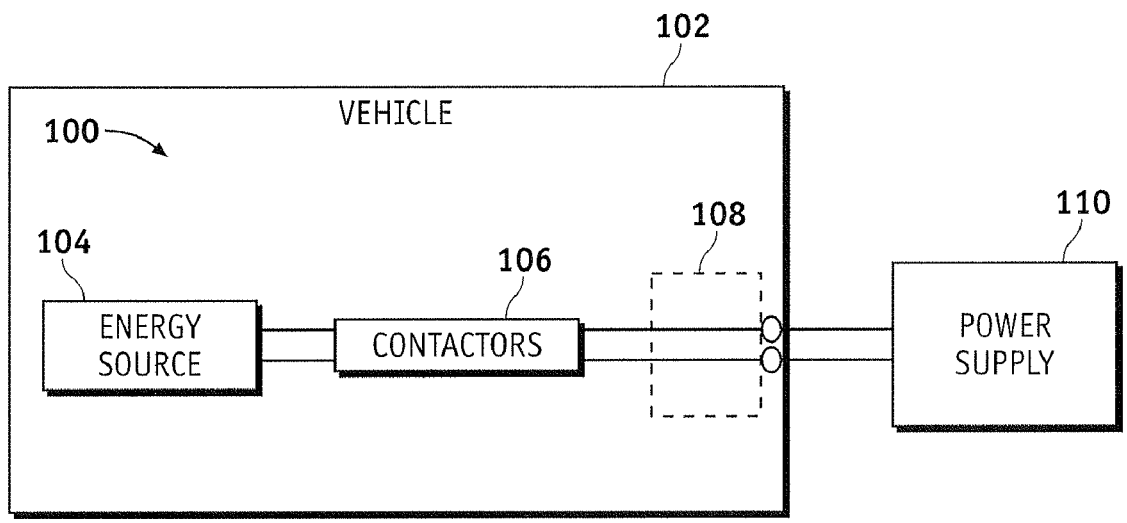
FIG. 1 is a block diagram of a precharge system for use in a vehicle with an external power supply in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to analog circuit design, signaling, sensing, switch control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to systems and methods for precharging a bus in order to couple a high-voltage energy source with another electrical component, such as a voltage regulated power supply or another vehicle module. When the high-voltage energy source is coupled the component, a desired power flow between or among the energy source and the component may be achieved.

Referring now to FIG. 1, in an exemplary embodiment, a precharge system 100 for a vehicle 102 includes an energy source 104, a set of contactors 106, and a bus 108, which may be referred to herein as a voltage bus, a power bus, or an electrical bus. The precharge system 100 may be coupled to a power supply 110. In an exemplary embodiment, the energy source 104 is coupled to the set of contactors 106, which in turn are connected to the bus 108. The bus 108 may be further coupled to the power supply 110, which may be external to the vehicle 102 (i.e., off-board) as shown in FIG. 1. In an exemplary embodiment, the precharge system 100 is configured to precharge the bus 108 before activating the contactors 106 to achieve electrical power flow between the power supply 110 and the energy source 104.

Referring again to FIG. 1, in an exemplary embodiment the vehicle 102 is an automobile. In an exemplary embodiment, the vehicle 102 is a plug-in hybrid or fully electric vehicle. In alternative embodiments, the vehicle 102 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In alternative embodiments, the vehicle 102 may be a fuel cell vehicle (FCV) that may not include an engine.

In an exemplary embodiment, the energy source 104 is a high-voltage energy source capable of storing electrical energy and providing direct current (DC) voltage. It should be understood that the phrase "high-voltage" as used herein generally refers to voltage levels or voltage ratings of greater than 60 volts DC (or 30 volts AC). In an exemplary embodiment, the energy source 104 has a nominal voltage range from 300 to 550 volts. In accordance with one embodiment, the energy source 104 is a rechargeable high-voltage battery pack capable of storing regenerative energy. In other embodiments, the energy source 104 may comprise a battery, a fuel cell, an ultracapacitor, or another suitable energy source.

In an exemplary embodiment, the set of contactors 106 includes a plurality of contactors which function as electrically-controlled switches, as is known in the art. In an exemplary embodiment, the set of contactors 106 are high-voltage contactors which may be activated to achieve power flow between the bus 108 and the energy source 104 and perform additional functions and tasks described in greater detail below.

Referring again to FIG. 1, in an exemplary embodiment, the power supply 110 is a voltage-regulated power supply capable of providing a voltage that is at least equal to the voltage of the energy source. The power supply 110 may supply voltage to the bus 108 in response to either a voltage command or a current command, as will be appreciated in the art. In an exemplary embodiment, the power supply 110 is capable of being commanded, via integrated logic or an external control module, to supply and/or provide a substantially fixed voltage with minimal deviation from the commanded voltage level (or setpoint). In accordance with one embodiment, the power supply 110 may be external to the vehicle 102 as shown. In accordance with one embodiment, the power supply 110 may comprise a plug-in charger configured to convert an input AC voltage to an output DC voltage. In other embodiments, the power supply 110 may comprise a vehicle charging station, a vehicle charger, a battery charger, a DC-to-DC converter coupled to a second energy source, or other comparable means for supplying power. In various alternative embodiments, the power supply 110 may be coupled to either AC or DC input voltages, which may be greater than or less than the commanded voltage level.

Figure 2:
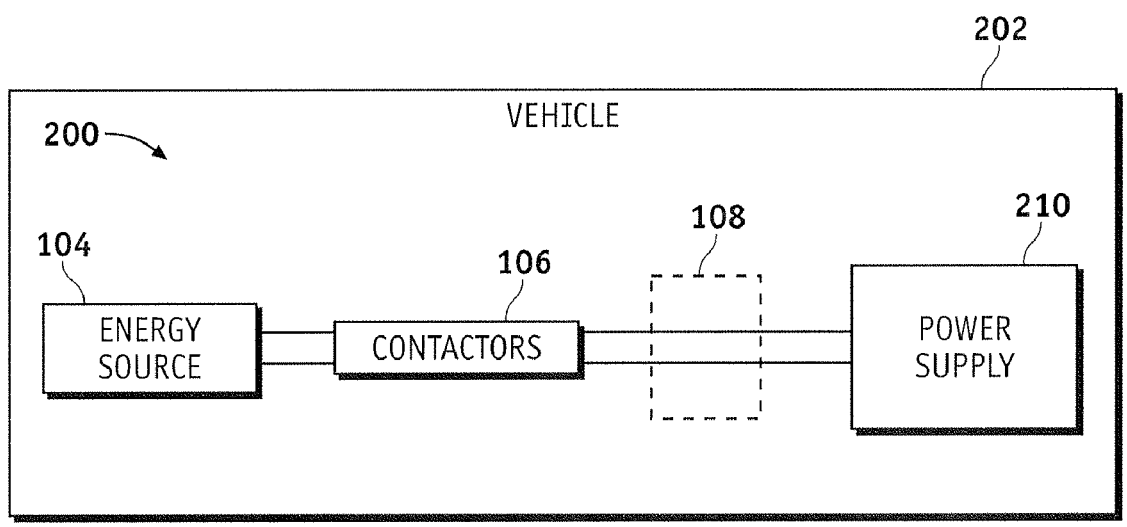
FIG. 2 is a block diagram of a precharge system for use in a vehicle with an internal power supply in accordance with one embodiment.

Referring now to FIG. 2, an alternate deployment is shown. In this exemplary embodiment, a precharge system 200 for a vehicle 202 may further include a power supply 210 in lieu of (or in addition to) an external power supply. The remaining elements of the precharge system 200 are similar to their counterpart elements found in the precharge system 100 described above with reference to FIG. 1. These common elements will not be redundantly described in detail here in the context of the precharge system 200.

The power supply 210 may be located within the vehicle 202 (i.e., on-board) and coupled to the bus 108 as shown. In accordance with one embodiment, the vehicle 202 may be of the same type as the vehicle 102 of FIG. 1 as discussed above. In an exemplary embodiment, the power supply 210 is a voltage-regulated power supply capable of providing a voltage that is at least equal to the voltage of the energy source, and may comprise a vehicle charger, a battery charger, a DC-to-DC converter coupled to a second energy source, or other comparable means for supplying power.

Figure 3:
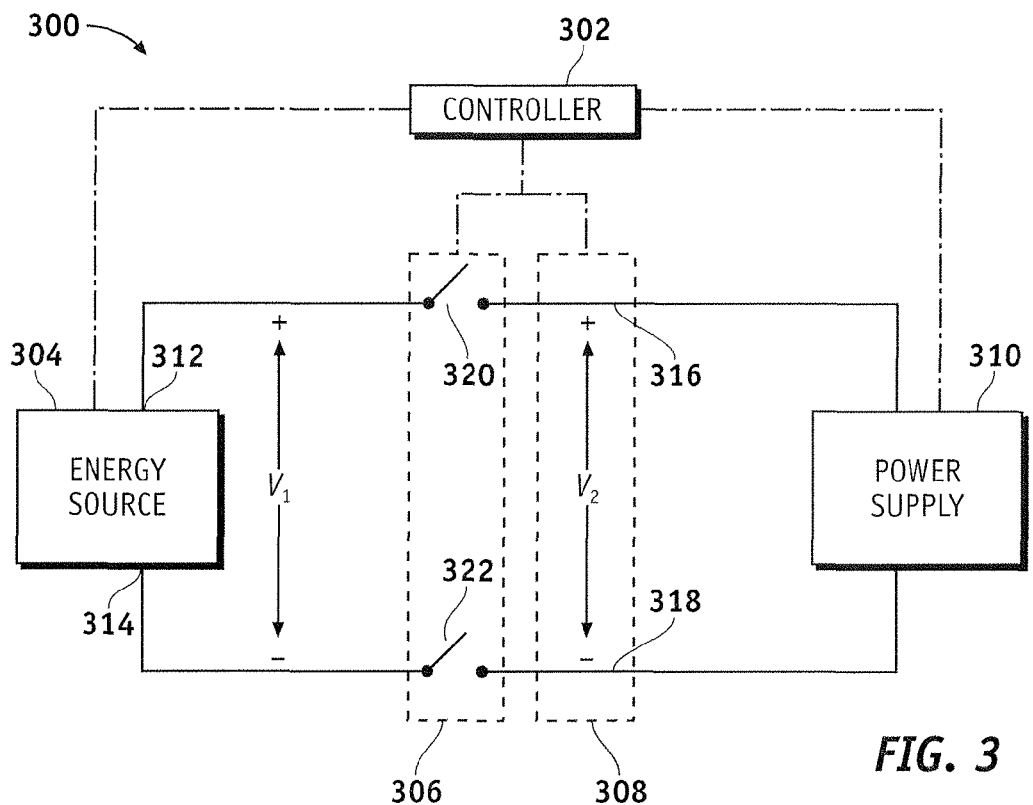
FIG. 3 is a block diagram of an embodiment of a precharge circuit suitable for use in the precharge system of FIG. 1 or FIG. 2.

Referring now to FIG. 3, a precharge circuit 300 for use in a precharge system 100, 200 may include an energy source 304, a set of contactors 306, a bus 308, a controller 302, and a power supply 310. In an exemplary embodiment, the energy source 304 has a positive terminal 312 and a negative terminal 314. The bus 308 comprises a positive rail 316 and a negative rail 318 and the set of contactors 306 comprises a first contactor 320 and a second contactor 322. The precharge circuit 300 may include additional sensors or other modules (not shown) for measuring voltage levels throughout the precharge circuit 300.

In an exemplary embodiment, the positive terminal 312 is coupled to one side of the first contactor 320, and the other side of the first contactor 320 is coupled to the positive rail 316. The negative terminal 314 is coupled to one side of the second contactor 322, and the other side of the second contactor 322 is coupled to the negative rail 318. The power supply 310 is coupled between the positive rail 316 and the negative rail 318. In an exemplary embodiment, the controller 302 is coupled to the energy source 304, the set of contactors 306, the bus 308, and the power supply 310. The controller 302 may be configured to measure or sense the voltage levels throughout the precharge circuit 300 (for example, at the energy source 304 or the bus 308) and may be configured to perform additional tasks and functions as discussed in greater detail below.

Referring again to FIG. 3, in accordance with one or more embodiments, the energy source 304, the set of contactors 306, the bus 308, and the power supply 310 may be identical to those as discussed above in regards to FIG. 1 and FIG. 2. In this regard, the power supply 310 may be an onboard component or a component that is external to the host vehicle. In an exemplary embodiment, the energy source 304 has a voltage ($V_1$) equal to the potential difference between the positive terminal 312 and the negative terminal 314. The bus 308 has a voltage ($V_2$) equal to the potential difference between the positive rail 316 and the negative rail 318. In an exemplary embodiment, the precharge circuit 300 may be configured such that the set of contactors 306 are activated (i.e., the first contactor 320 and the second contactor 322 are closed) when the voltage of the energy source 304 and the voltage of the bus 308 within a threshold tolerance ($V_{TH}$) of each other (i.e., $|V_1-V_2| \leq V_{TH}$), as described in greater detail below.

Figure 4:
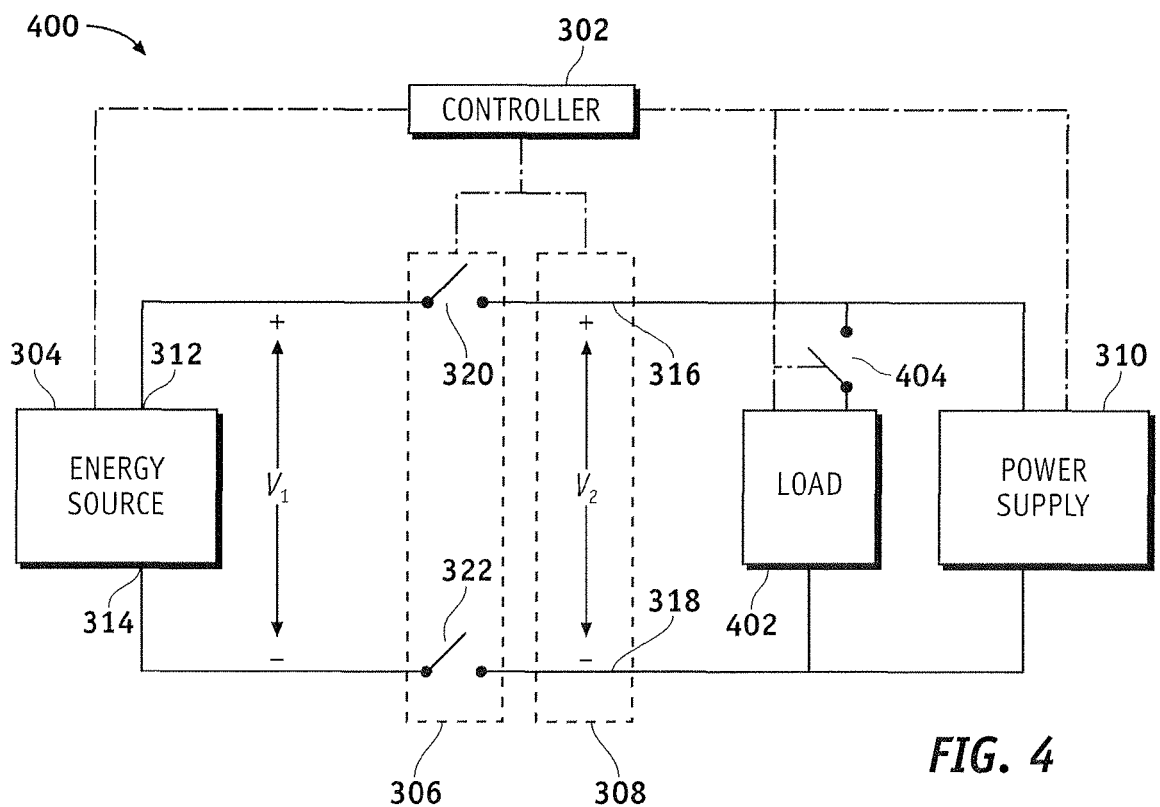
FIG. 4 is a block diagram of an embodiment of a precharge circuit suitable for use in the precharge system of FIG. 1 or FIG. 2.

Referring now to FIG. 4, in an exemplary embodiment, a precharge circuit 400 may further include an electrical load 402. Depending upon the embodiment, the precharge circuit 400 may also include a switch 404 or contactor which may be coupled to the controller 302 and used to selectively couple the electrical load 402, as described in greater detail below. Other than the inclusion of the electrical load 402 and the switch 404, the precharge circuit 400 is similar to the precharge circuit 300 of FIG. 3. Accordingly, common features and elements will not be redundantly described here.

In an exemplary embodiment, the electrical load 402 is coupled between the bus 308 and the power supply 310 such that the electrical load 402 is electrically parallel to the power supply 310. In accordance with one embodiment, the electrical load 402 comprises a control circuit for the purposes of stabilizing the bus voltage and/or current as discussed in greater detail below. In other embodiments, the electrical load 402 is a vehicle power module (such as an inverter), an electric motor, or another vehicle module capable of operating at the voltage level of the energy source (i.e., $V_1$). In accordance with one embodiment, the controller 302 is coupled to the electrical load 402 and may be configured to perform additional functions as described in greater detail below.

Figure 5:
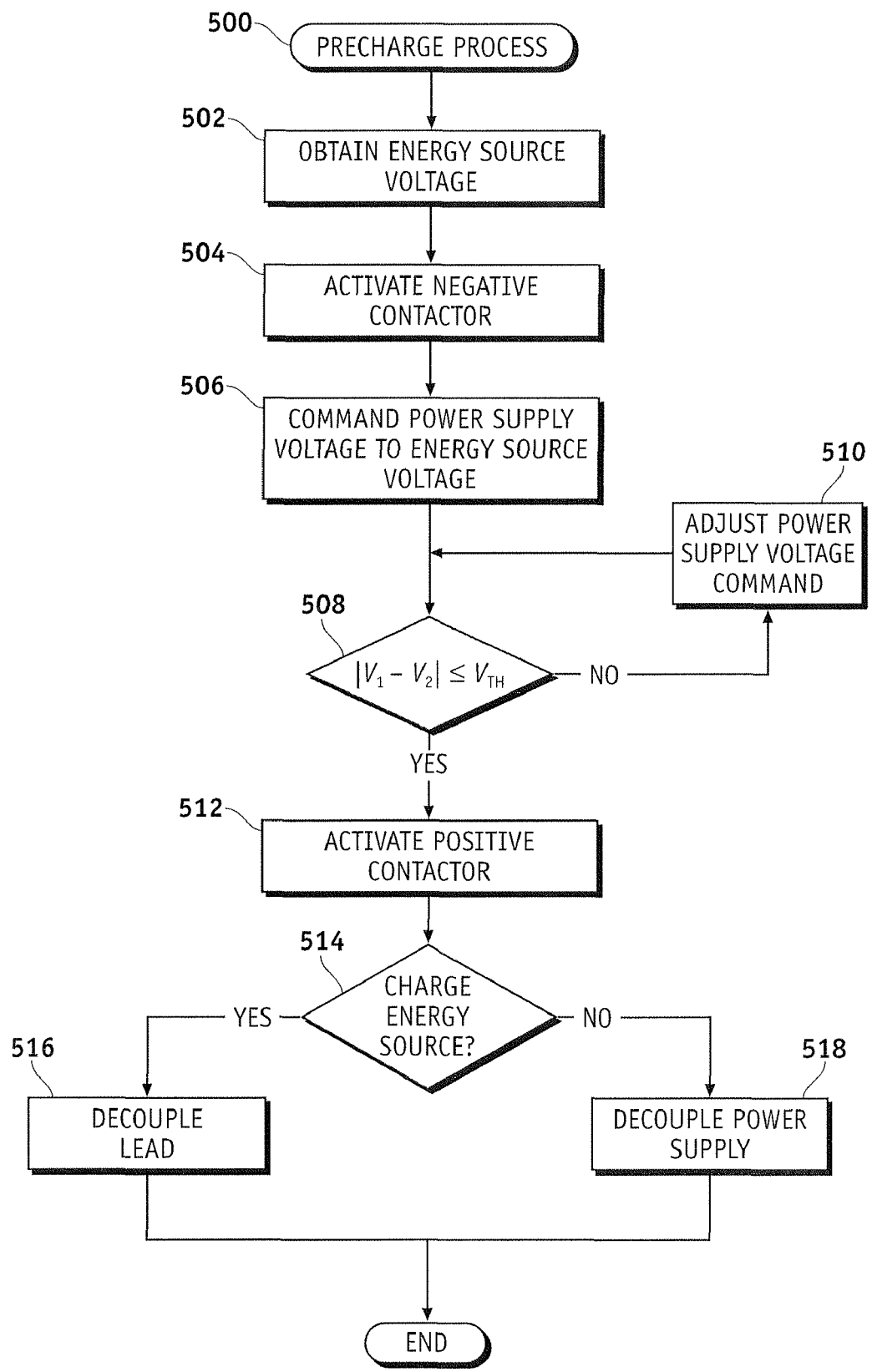
FIG. 5 is a flow diagram of a process for precharging a bus in accordance with one embodiment.

Referring now to FIG. 5, in an exemplary embodiment, a precharge system 100, 200 may be configured to perform a precharge process 500 and additional tasks, functions, and operations described below. The various tasks may be performed by software, hardware, firmware, or any combination thereof. For illustrative purposes, the following description may refer to elements mentioned above in connection with FIGS. 1-4. In practice, the tasks, functions, and operations may be performed by different elements of the described system, such as the controller 302. It should be appreciated any number of additional or alternative tasks may be included, and may be incorporated into a more comprehensive procedure or process having additional functionality not described in detail herein.

Referring again to FIG. 5, and with continued reference to FIG. 3 and FIG. 4, the precharge process 500 may be initiated in response to a signal or command from a vehicle control module (i.e., an electronic control unit or ECU). Alternatively, the precharge process 500 may begin upon detection of a power supply coupled to the bus. In an exemplary embodiment, the precharge process 500 is configured to obtain the voltage of the energy source ($V_1$) (task 502). The precharge system may include sensors or other modules to obtain the voltage of the energy source (e.g., sense or measure $V_1$). For example, the controller 302 may be configured to measure or sense the voltage at the energy source 304. In an alternative embodiment, another vehicle module (i.e., an ECU) may provide the energy source voltage information.

In an exemplary embodiment, the precharge process 500 activates the contactor coupled between the negative terminal and the negative rail (e.g., the second contactor 322) (task 504). As shown in FIG. 3 and FIG. 4, activating the second contactor 322 biases the energy source 304, the bus 308, and the power supply 310 from a common negative or ground reference voltage, as will be understood in the art. However, in alternative embodiments, biasing the circuit may be avoided and the contactors may be activated as discussed below.

In an exemplary embodiment, the precharge process 500 commands the power supply to provide a voltage equal to the voltage of the energy source ($V_1$) (task 506). For example, depending on the embodiment, the precharge process 500 may provide an operative voltage command or an operative current command to the power supply. In accordance with one embodiment, the power supply may be commanded to slowly increase the voltage and/or current supplied to the bus. This minimizes the risk of overshooting the voltage of the energy source and allows for more fine tuned control of the voltage of the bus. In an alternative embodiment, the power supply may be commanded to rapidly supply a voltage and/or current to the bus. While this may achieve a fast voltage rise and decrease the time for precharging the bus, this increases risks of overshoot and allows for less control of the voltage of the bus. For example, as shown in FIG. 4, in accordance with one or more embodiments, an electrical load 402, such as a control circuit or another vehicle module, may be used to stabilize and/or achieve finer control of the voltage and/or current supplied by the power supply.

In an exemplary embodiment, the precharge process 500 may be configured to monitor the voltage of the bus ($V_2$) and determine whether the voltage of the bus is within a threshold tolerance ($V_{TH}$) or window of the voltage of the energy source (i.e., $|V_1-V_2| \leq V_{TH}$) (task 508). The threshold tolerance is chosen to prevent potential damage to electrical components that may be caused by the power supply overshooting the voltage of the energy source. In an exemplary embodiment, the threshold tolerance is chosen to be approximately 5% (i.e., $V_{TH}=5\% \times V_1$). However, the threshold tolerance may be adjusted to accommodate the operating characteristics of a particular precharge system or component, as will be appreciated in the art.

Figure 6:
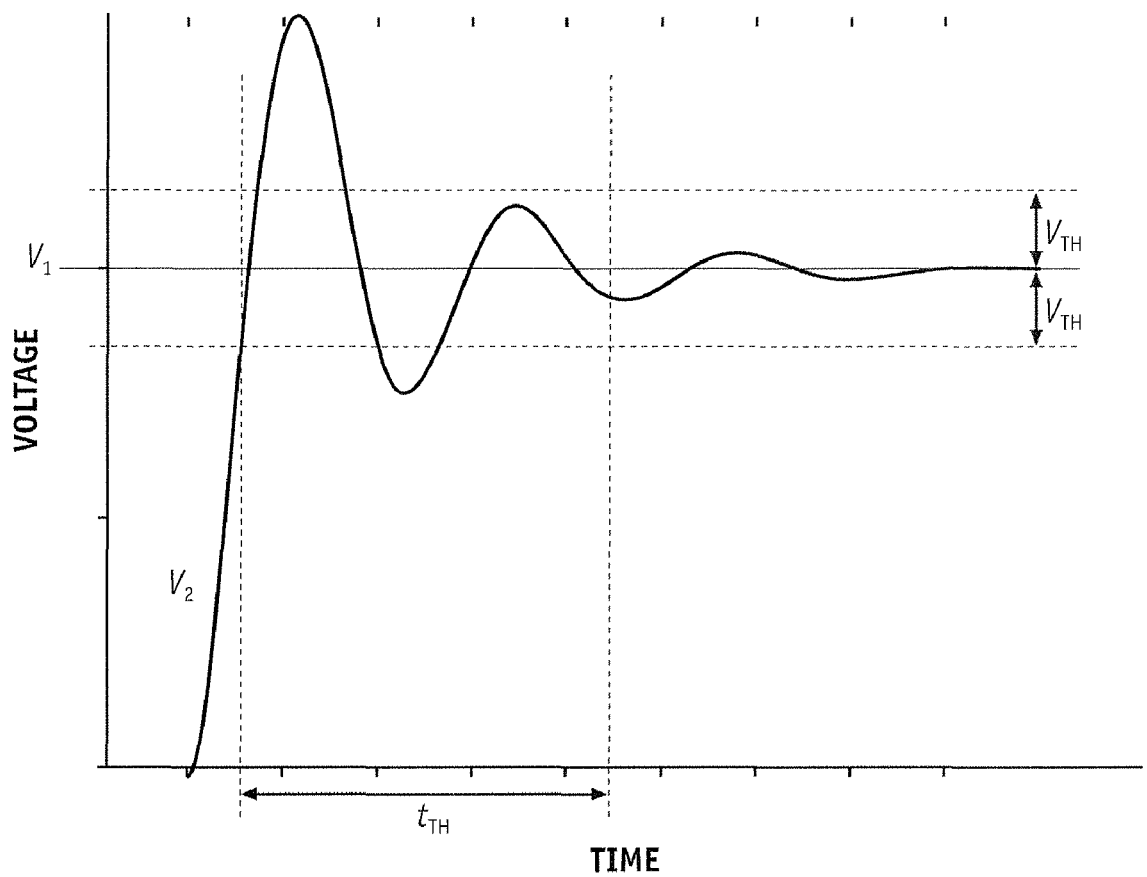
FIG. 6 is a graph of the voltage of a high-voltage bus versus time for a precharge process in an exemplary embodiment.

Referring now to FIG. 6, in an exemplary embodiment, the precharge process 500 may be configured to wait for a time period ($t_{TH}$) to ensure that the voltage of the bus ($V_2$) is stable and within the threshold tolerance after the time period. However, it should be appreciated that the precharge process 500 may be implemented without waiting for a time period.

Referring again to FIG. 5, in an exemplary embodiment, if the voltage of the bus is not within the threshold tolerance of the voltage of the energy source, the precharge process 500 may adjust the voltage command provided to the power supply (task 510). For example, if the voltage of the bus is less than the voltage of the energy source, the precharge process 500 may increase the voltage and/or current command provided to the power supply. Alternatively, the precharge process 500 may be configured to command the power supply to produce a reduced voltage level if the voltage of the bus exceeds voltage of the energy source by more than the threshold tolerance.

In an exemplary embodiment, the precharge process 500 may be configured to activate the contactor coupled between the positive terminal and the positive rail (e.g., the first contactor 320) when the voltage of the bus is within the threshold tolerance of the voltage of the energy source (task 512). In accordance with one embodiment, if the circuit is not biased as discussed above (task 504), the precharge process 500 may alternatively be configured to activate the set of contactors in unison when the voltage of the bus is within the threshold tolerance of the voltage of the energy source.

In an exemplary embodiment, the precharge process 500 may determine a desired operating mode based on whether or not the energy source is to be charged (task 514). The operating mode may be indicated or provided from another vehicle control module (i.e., an ECU), or may be determined by the controller, for example, based on the state of charge of the energy source or other environmental factors. In accordance with one embodiment, if the energy source is to be charged (e.g., the controller measures a low state of charge at the energy source), the electrical load (if present) is decoupled from the precharge circuit in order to charge the energy source from the power supply (task 516). If a control circuit is used to assist control of the voltage and/or current from the power supply while precharging the bus, the controller can decouple the control circuit from the bus and/or power supply. For example, as shown in FIG. 4, this may be accomplished by deactivating (e.g., switching off) switch 404. Alternatively, if the energy source is not identified as to be charged, the precharge process 500 may decouple the power supply from the precharge circuit (e.g., by decoupling using switches or turning off the power supply) and allowing the energy source to provide energy to an electrical load (task 518).

One advantage of the system and/or method described above is that the precharge system 100, 200 does not require a precharge resistor or additional precharge contactors for the purpose of inrush current limiting. Furthermore, the precharge time is not limited by the RC characteristics of the system, and the systems and methods discussed herein may be adapted for improved performance and shorter precharge time. Other embodiments may utilize the systems and methods described above in different types of automobiles, different vehicles (e.g., watercraft and aircraft), or in different electrical systems altogether, as it may be implemented in any situation where a bus or another electrical component needs to be reliably coupled to an energy source.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A precharge system for use in a vehicle, the precharge system comprising:
a first energy source having a first terminal and a second terminal, wherein the first energy source has a first voltage equal to a potential difference between the first terminal and the second terminal;
a bus having a first rail and a second rail, wherein the bus has a second voltage equal to a potential difference between the first rail and the second rail;
a first contactor coupled between the first terminal and the first rail;
a second contactor coupled between the second terminal and the second rail; and
a controller coupled to the first energy source, the bus, the first contactor, and the second contactor, the controller being configured to:
provide a voltage command to regulate the second voltage to the first voltage;
activate the second contactor; and
thereafter activate the first contactor if the magnitude of a difference between the first voltage and the second voltage is less than a threshold tolerance.

2. The precharge system of claim 1 further comprising a power supply coupled to the bus, the power supply being coupled to the controller and configured to regulate the second voltage in response to the voltage command.

3. The precharge system of claim 2, further comprising an electrical load coupled to the bus, such that the electrical load and the power supply are electrically parallel.

4. The precharge system of claim 3, wherein the electrical load is a control circuit.

5. The precharge system of claim 3, wherein the electrical load is a vehicle power module.

6. The precharge system of claim 2, wherein the power supply is a battery charger.

7. The precharge system of claim 2, further comprising a second energy source, wherein the power supply is a DC-to-DC converter coupled to the second energy source.

8. The precharge system of claim 1, wherein the first energy source is selected from a group consisting of a battery pack, a fuel cell, and an ultracapacitor.

9. The precharge system of claim 1, wherein the bus is coupled to a vehicle charging station.

10. A method for precharging a bus coupled to a set of contactors, wherein the set of contactors is coupled between the bus and an energy source, the method comprising:
  providing a voltage command or a current command to a power supply coupled to the bus to regulate a voltage of the bus to a voltage level equal to the voltage of the energy source, the power supply being configured to regulate the voltage of the bus in response to the voltage command or the current command; and
  thereafter activating the set of contactors if the magnitude of a difference between the voltage of the bus and the voltage of the energy source is less than a threshold tolerance.

11. The method of claim 10, further comprising decoupling an electrical load from the bus in response to activating the set of contactors.

12. The method of claim 10, further comprising decoupling the power supply from the bus in response to activating the set of contactors.

13. The method of claim 10 further comprising activating the set of contactors if the voltage of the bus is equal to the voltage of the energy source.

14. The method of claim 10, further comprising commanding the power supply to a reduced voltage level if the magnitude of the difference between the voltage of the bus and the voltage of the energy source is greater than the threshold tolerance.

15. The method of claim 10, wherein activating the set of contactors further comprises:
  activating a second contactor of the set of contactors, the second contactor being coupled in series between a negative rail of the bus and a negative terminal of the energy source; and
  activating a first contactor of the set of contactors if the magnitude of a difference between the voltage of the bus and the voltage of the energy source is less than the threshold tolerance, the first contactor being coupled in series between a positive rail of the bus and a positive terminal of the energy source.

16. The method of claim 10, further comprising
  waiting for a time period after the magnitude of the difference between the voltage of the bus and the voltage of the energy source is less than the threshold tolerance before activating the set of contactors; and
  adjusting the voltage command or the current command to regulate the voltage of the bus to an adjusted voltage level when the magnitude of the difference between the voltage of the bus and the voltage of the energy source is greater than the threshold tolerance after waiting for the time period and before activating the set of contactors.

17. The precharge system of claim 2, wherein the power supply comprises a voltage-regulated power supply configured to supply the second voltage to the bus in response to the voltage command.

18. The precharge system of claim 1, wherein the controller is configured to:
  wait for a time period after the magnitude of the difference between the first voltage and the second voltage is less than the threshold tolerance before activating the first contactor; and
  adjust the voltage command to regulate the second voltage to an adjusted voltage level when the magnitude of the difference between the first voltage and the second voltage is greater than the threshold tolerance after waiting for the time period and before activating the first contactor.

19. A precharge system comprising:
  a first energy source having a first terminal and a second terminal, wherein the first energy source has a first voltage equal to a potential difference between the first terminal and the second terminal;
  a bus having a first rail and a second rail, wherein the bus has a second voltage equal to a potential difference between the first rail and the second rail;
  a first contactor coupled between the first terminal and the first rail;
  a second contactor coupled between the second terminal and the second rail;
  a power supply coupled to the bus; and
  a controller coupled to the first energy source, the power supply, the bus, the first contactor, and the second contactor, the controller being configured to:
    provide a command to regulate the second voltage to the first voltage to the power supply, the power supply being configured to regulate the second voltage in response to the command;
    activate the second contactor; and
    thereafter activate the first contactor if the magnitude of a difference between the first voltage and the second voltage is less than a threshold tolerance.

20. The precharge system of claim 19, wherein the power supply is configured to regulate the second voltage by providing a voltage equal to the first voltage to the bus in response to the command.

* * * * *